(12) United States Patent
Sherburne

(10) Patent No.: US 9,380,261 B2
(45) Date of Patent: Jun. 28, 2016

(54) MULTI-CAMERA ACCESS FOR REMOTE VIDEO ACCESS

(71) Applicant: Cisco Technology, Inc., San Jose, CA (US)

(72) Inventor: Philip F. Sherburne, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/189,472

(22) Filed: Feb. 25, 2014

(65) Prior Publication Data

US 2015/0244977 A1 Aug. 27, 2015

(51) Int. Cl.
*H04N 7/15* (2006.01)
*H04N 7/14* (2006.01)
*H04L 29/06* (2006.01)

(52) U.S. Cl.
CPC ............ *H04N 7/142* (2013.01); *H04L 65/1069* (2013.01); *H04L 65/1073* (2013.01); *H04L 65/4038* (2013.01); *H04N 7/152* (2013.01)

(58) Field of Classification Search
CPC ............ H04N 7/15; H04N 7/14; H04N 7/142
USPC ............ 348/14.01–14.16; 455/422, 556, 557; 709/227, 206
See application file for complete search history.

(56) References Cited

U.S. PATENT DOCUMENTS

| | | | | |
|---|---|---|---|---|
| 8,494,507 | B1 * | 7/2013 | Tedesco | A61F 4/00 434/112 |
| 9,124,955 | B2 * | 9/2015 | Geva | B60K 28/066 |
| 2003/0104806 | A1 * | 6/2003 | Ruef et al. | 455/422 |
| 2005/0278446 | A1 * | 12/2005 | Bryant | 709/227 |
| 2007/0254640 | A1 | 11/2007 | Bliss | |
| 2008/0015881 | A1 * | 1/2008 | Shankar | G06Q 30/016 455/556.1 |
| 2009/0033736 | A1 * | 2/2009 | Thomason | H04N 7/147 348/14.02 |
| 2010/0066485 | A1 | 3/2010 | Hyatt | |
| 2011/0175977 | A1 * | 7/2011 | Dahl | H04L 12/1822 348/14.12 |
| 2011/0249086 | A1 * | 10/2011 | Guo et al. | 348/14.12 |
| 2013/0044992 | A1 | 2/2013 | Boland et al. | |
| 2013/0120602 | A1 | 5/2013 | Huang | |
| 2013/0215213 | A1 * | 8/2013 | Power | H04L 65/4076 348/14.02 |
| 2013/0250135 | A1 | 9/2013 | Blum et al. | |
| 2013/0325970 | A1 * | 12/2013 | Roberts et al. | 709/206 |
| 2014/0036733 | A1 * | 2/2014 | Teng | G06Q 10/109 370/260 |
| 2015/0009348 | A1 * | 1/2015 | Vartanian | H04N 7/183 348/211.3 |

* cited by examiner

*Primary Examiner* — Melur Ramakrishnaiah
(74) *Attorney, Agent, or Firm* — Lempia Summerfield Katz LLC

(57) ABSTRACT

In one embodiment, multiple cameras are logically associated in a guest registry with a mobile device. One of the cameras may be internal to the mobile device, and one of the cameras may be external to the mobile device. A network device accesses the guest registry in response to a request from the mobile device. The request may be a request for a conference call, or the request may be a request for service. A conference call is initiated in response to the request. The network device receives video data from the multiple cameras associated with the mobile device and establishes a multiple party conference call including the multiple cameras and an external device.

20 Claims, 7 Drawing Sheets

MULTI-CAMERA ACCESS FOR REMOTE VIDEO ACCESS

TECHNICAL FIELD

This disclosure relates in general to the field of video delivery, and more specifically, to a video conference with multiple camera access at an endpoint.

BACKGROUND

Video conferencing includes a set of technologies to facilitate two-way audio and video communication between two endpoints. Videoconferencing often requires specialized equipment. For example, some videoconferencing systems include life sized monitors, dedicated rooms, and high bandwidth communication equipment. These types of videoconferencing boardrooms may be very expensive.

Simpler video conferencing systems that utilize mobile phones have become popular. A front facing camera allows the user to view the screen and be photographed at the same time. This arrangement is beneficial for person to person communication between mobile devices. The screen of each mobile device may display the other user in a large frame and the local user in a smaller, picture in picture, frame.

However, in order to see the screen, each user is limited to pointing the front facing camera near his face. Another arrangement for the camera may be better suited for other applications.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a method includes registering a first camera in a guest registry, wherein the first camera is integrated with a mobile device, receiving first video data from the first camera, registering a second camera in the guest registry as logically associated with the mobile device, receiving second video data from the second camera, and establishing, via a network, a multiple party conference call including the first camera, the second camera, and an external device.

Example Embodiments

Front facing cameras allow face to face communication between mobile devices. Other applications such as service calls may be supplemented if the camera of at least one of the mobile devices captures images of other objects or if one of the mobile devices includes multiple cameras. The service calls may be customer service calls. A user repairing a device can send images of the device under repair. A service technician on the call can see the device and instruct the user on the repair. Examples of the device include a vehicle, a computer, an appliance, a house, a windmill, or an oil rig.

The auxiliary camera may be incorporated into the mobile device or be a peripheral to the mobile device. The mobile device may establish a video conference in which each of the multiple cameras is a party. The multiple cameras may be displayed to the service technician in a split screen format. The service technician may be inside an enterprise and/or behind a firewall and the user of the mobile device may be outside of the enterprise and/or outside of the firewall.

Figure 1:
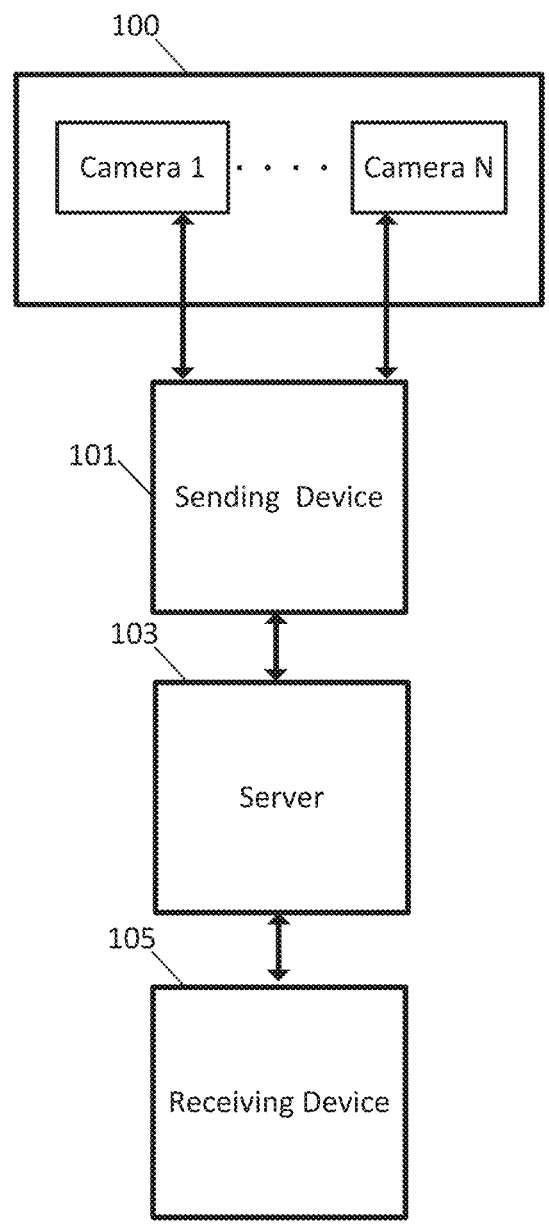
FIG. 1 illustrates an example system for multiple camera access in a video conference.

FIG. 1 illustrates an example system for multiple camera access in a video conference. The system includes an array of cameras 100, a sending device 101, a server 103, and a receiving device 105. Additional, different, or fewer components may be included.

The sending device 101 is coupled with multiple cameras 1 through N. Each of the cameras is assigned a code which is associated by the server 103 with the sending device 101. The server 103 associates the code for each of the cameras with an address of the sending device 101. When receiving a request for a video conference from sending device 101 or an acceptance for a request for a video conference from the sending device 101, the server 103 is configured to include multiple camera views for the sending device 101 when creating the video conference. The server 103 may generate a video stream that includes video data from the cameras 1 through N and send the video stream to the receiving device 105.

Figure 2:
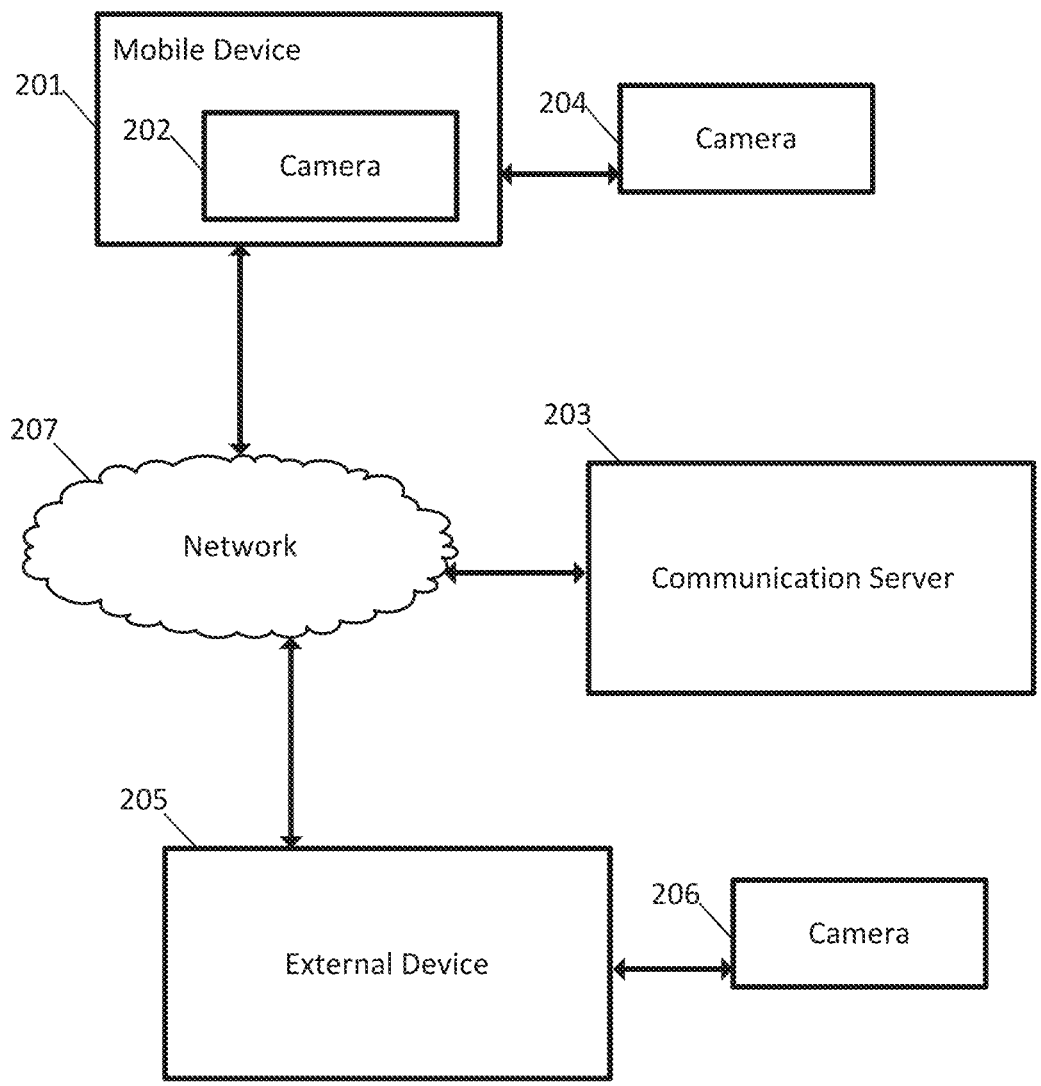
FIG. 2 illustrates another example system for multiple camera access in a video conference.

FIG. 2 illustrates another example system for multiple camera access in a video conference. The system includes a mobile device 201, a communication server 203, and an external device 205. The mobile device 201 is coupled with at least one internal camera 202 and at least one external camera 204. The mobile device 201 may include a processor and a memory for performing the functions described with respect to the mobile device 201. The external device 205 may be coupled with at least one camera 206, which may be internal or external to the external device 205. The mobile device 201, the communication server 203, and the external device 205 may communicate via one or more networks 207. The networks 207 may include the Internet or cellular communication. In some remote worksites, the network 207 may alternatively or additionally include any combination of satellite communication, microwave communication, and undersea cables. Additional, different, or fewer components may be used.

The communication server 203 may include a guest registry database stored in memory. The guest registry associates cameras and mobile devices. The mobile device 201 may be associated with multiple cameras. In one example, the mobile device 201 may be associated with the external camera 204 and the internal camera 202. In another example, the mobile device 201 may be associated with one or more external cameras and two or more internal cameras. In the registry, the cameras may be assigned a camera identification value and the mobile device may be assigned a device identification value. The device identification values may include the internet protocol (IP) address of the device or the machine access control (MAC) address of the device.

The camera identification values may include the MAC address of the camera or another identification value. The camera identification value may identify one or more of a type of camera (e.g., 'E' for external, 'I' for internal), a size of the camera viewing area (e.g., length dimension and height dimension, aspect ratio, and/or diagonal viewing area), a resolution of the camera (e.g., pixel per unit length, lines of resolution, or another measurement of resolution), a refresh rate of the camera (e.g., frames per second, hertz, or another measurement of refresh), or other technical aspects of the camera.

The mobile device 201 receives video data from the at least one internal camera 202 and the at least one external camera 204. The video data from the internal camera 202 may include images of the user for the video call. The video data from the external camera 204 may include a problem under investigation that is the subject of the video call. The problem under investigation may include a device for which technical support is sought. The device may be a computer, an automobile, a phone, or a household appliance.

The problem under investigation may be medical. The problem under investigation may relate to a human's body or an animal's body. Example medical problems that may be imaged by the external camera may include suspicious moles, rashes, infections, aching teeth, irritated eyes, or other body parts. The problem under investigation may be the birth of a child or animal. The problem under investigation may be a professional service. For example, the user may be a hairdresser, nail technician, painter, window washer, or another service professional that is receiving instruction remotely.

The problem under investigation may be a home repair. The problem under investigation may be cabinet replacement, plumbing, floor refinishing, painter, electrical work, or another example of work done on a home in which instruction may be received over the video call.

The problem under investigation may be technical support or information technology (IT) support. The problem under investigation may include connection or wiring for a television, a cable box, a video game, a stereo, a security system, or another device. The problem under investigation may include computer networking or software.

The problem under investigation may be remote from the mobile device 201. For example, the mobile device 201 may be in one position and the at least one external camera 204 may be at another position. For example, the mobile device 201 and the user may be located in a control room and the at least one external camera 204 may be located near the problem. Consider the example of an oil rig. The at least one external camera 204 may be on the oil rig platform or near a drill, and the mobile device 201 may be in an enclosed control room. Consider the example of a space station. The at least one camera 204 may be outside of the space station and the mobile device 201 may be inside of the space station.

In particular industries, such as the oil industry, the experienced workers may prefer to avoid harsh working conditions (e.g., on an oceanic oil rig). Less experienced, and possibly lower paid workers may work in the harsh working conditions using the mobile device 201 and the at least one camera 204, while the experienced worker provides instructions and expertise via the external device 205.

The communication server 203 may include a call manager or act as a proxy to provide the guest registry database for the call manager. The call manager is hardware, or software executed by the hardware, configured to manage communication between one or more endpoints. The call manager may control call processing, routing, call option (e.g., caller identification), and telephone features (e.g., call hold, call transfer, or conferencing), device configuration, and other telephony functions and parameters.

The call manager may administer session initiation protocol (SIP), skinny client control protocol (SCCP), H.323, media gateway control protocol (MGCP), or other protocols. H.323 may be defined according to the international telecommunication union recommendation H.323 "Packet-based multimedia communication systems," as published in December 2009 and available at http://www.itu.int/rec/T-REC-H.323/. MGCP may be defined according to RFC 2805 as published in April 2000 and available at http://tools.ietf.org/html/rfc2805.

The communication server 203 receives the first video data including images of the user from the internal camera 202 of the mobile device 201 and the second video data including images of the problem under investigation from the external camera 204. The external camera 204 may be connected to the mobile device 201 or connected directly to a network. In either case, the external camera 204 is listed in a lookup table such as the guest registry database as associated with the mobile device 101. Thus, the communication server 203 accesses guest registry database to determine the second camera is logically associated with the mobile device 201.

In response to identification of the association of the external camera 204, the communication server 203 is configured to establish a multiple party conference call including the internal camera 202, the external camera 204, and the external device 205. The communication server 203 may also receive third video data from the external device. In one example, the conference call includes two cameras for the mobile device 201 as a single party of the conference call. In another example, the two cameras are separate parties to the conference call.

Figure 3:
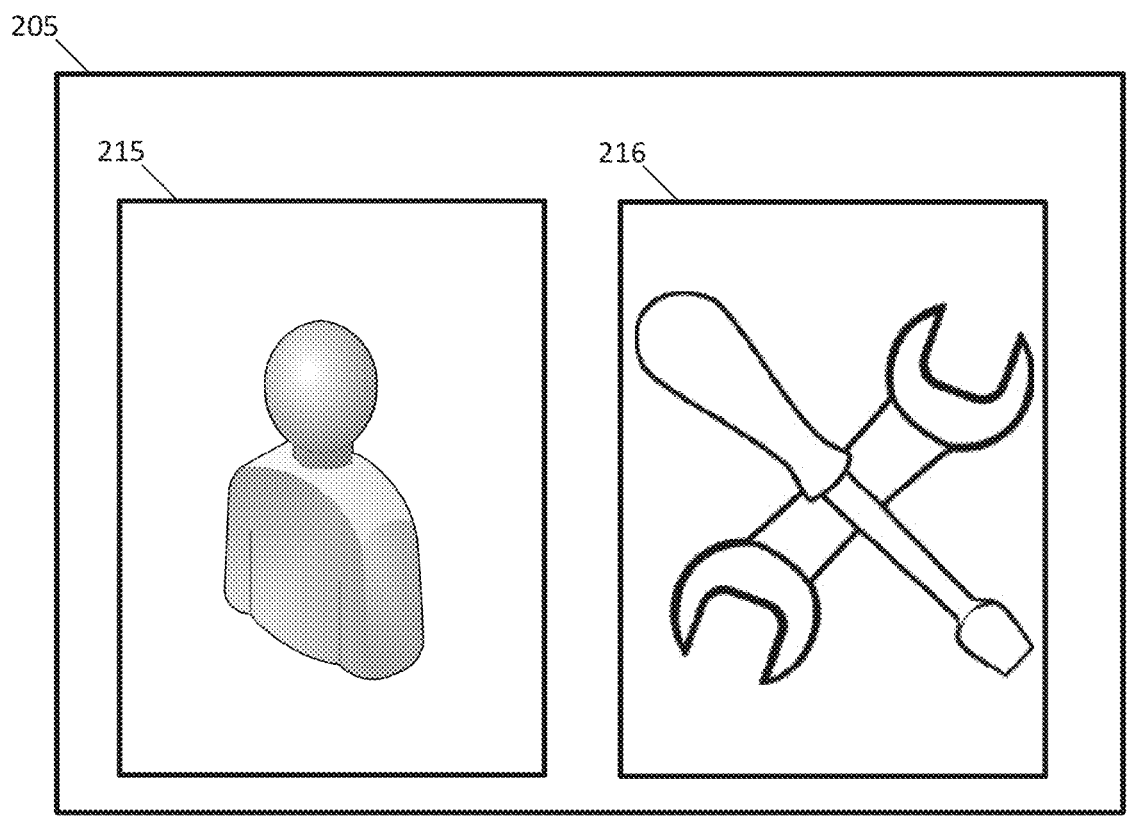
FIG. 3 illustrates an example display for multiple camera access in a video conference.

FIG. 3 illustrates an example screen display for multiple camera access in a video conference. The video data on the display may be represented on the external device 205 and a similar display may be presented on the mobile device 201. A first portion 215 of the display includes video data from the internal camera 202 associated with the mobile device 201 and a second portion 216 of the display includes video data from the external camera 204 associated with the mobile device 201. The first portion 215 may include the image of the user and the second portion 216 may include an object of interest under repair or investigation.

From the display of the external device 205, a technical support representative can see the customer and another object at the same time. The view of the second portion 216 of the display may originate with a handheld camera. In another example, the view of the second portion 216 may originate with a head mounted camera. The head mounted camera may be on eyeglasses, a helmet, a hat, or a headband of the customer. Therefore, the second portion 216 includes the line of sight or near the line of sight of the customer. The second portion 216 may include a machine that the customer is installing, troubleshooting, repairing, or performing maintenance on. For example, the technical support representative may be instructing the customer to install software on a computer, change brake pads of a car, install a tile backsplash, mount a flat screen television, or deactivate a nuclear reactor.

Figure 4:
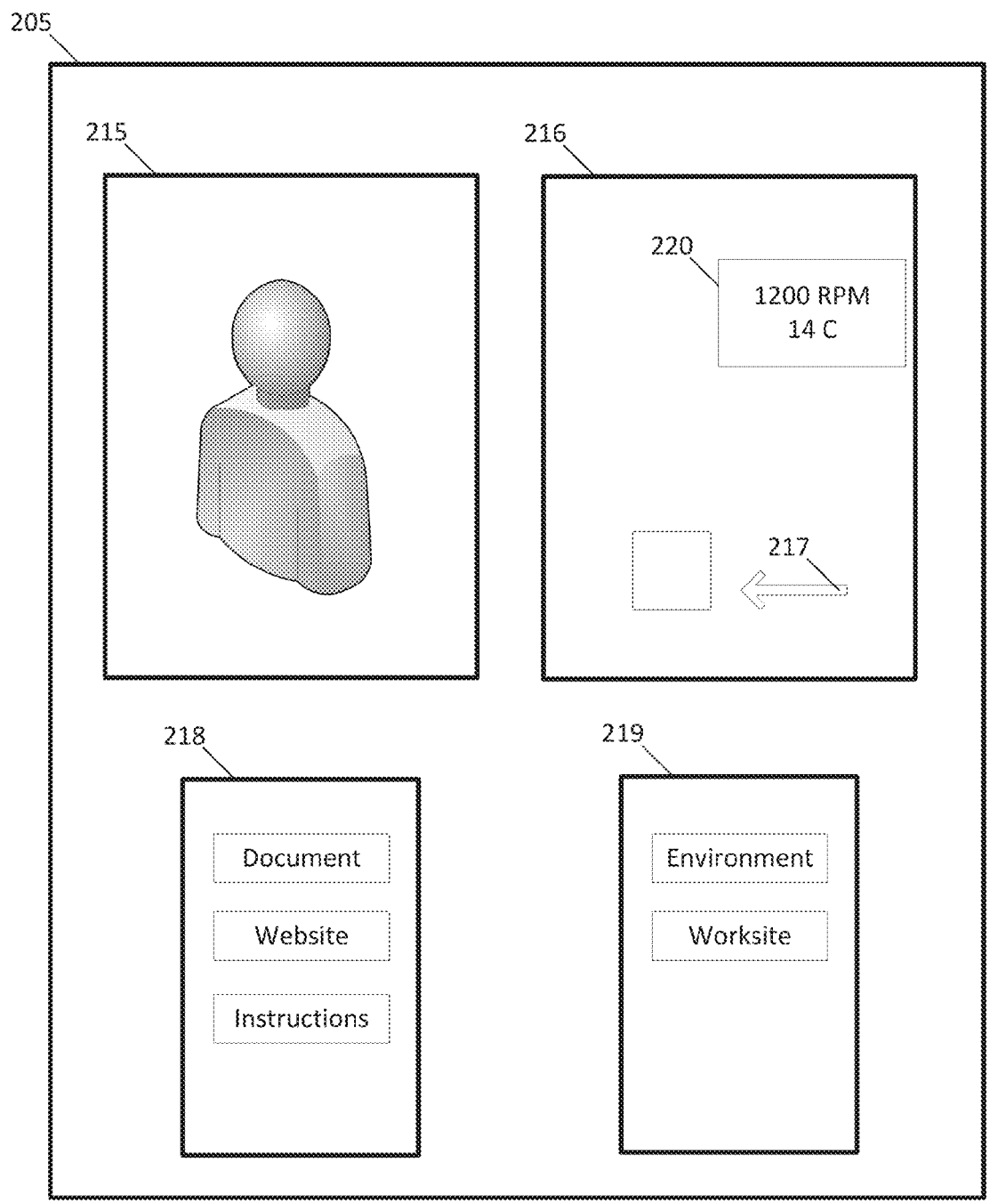
FIG. 4 illustrates another example display for multiple camera access in a video conference.

FIG. 4 illustrates another example display for multiple camera access in a video conference. The video data on the display may be represented on the external device 205 and a similar display may be presented on the mobile device 201. A first portion 215 of the display includes video data from the internal camera 202 associated with the mobile device 201 and a second portion 216 of the display includes video data from the external camera 204 associated with the mobile device 201. Various additional functions may be provided by the display alone or in combination.

In one example, the video data from the external camera 204 in second portion 216 may be annotated or augmented from the external device 205, the mobile device 201 or both. For example, consider a computer, a car, or an oil rig that appears in the second portion 216. The user of the external device 205 could circle, high light, or draw an arrow 217 to emphasis a particular portion of the video data. The user of the external device 205 may provide instructions using the annotation (e.g., turn this bold) or ask a question regarding the annotation (e.g., what does this gauge read).

In another example, a third portion 218 of the display may include shared information. For example, the user of the external device 205 may provide a document that relates to the subject matter of the video data. The document could be instructions on the job being performed (e.g., step by step instructions for changing a spark plug or unclogging an oil well). The shared information could be accessed from a website or another source. The information of the third portion 218 may be provided by any combination of the mobile device 201 or the external device 205.

In another example, a fourth portion 219 of the display may include sensor measurements in real time or time-based averages. The sensors may include environmental sensors such as temperature sensors (e.g., air temperature, water temperature), pressure sensors, wind sensors, visibility sensors or other sensors. The sensors may include worksite specific sensors such as pipe pressure for an oil well, energy usage at the worksite, temperature of the object under inspection, speed of the object under inspection or other sensors. The fourth portion 219 may be overlaid as a heads up display 220 on one or more of the first portion 215, the second portion 216, or the third portion 218. Thus, a single display may include the user of the mobile device 201, sensor data from the worksite, and images of the worksite. The sensors may be arranged in a sensor array. The sensor array may be in communication with mobile device 201 or another computing device to relay sensor data through the network 207.

The control or ability to provide annotations, share documents or website, view or alter sensor readings, or other features may be passed between the user of the mobile device 201 and the user of the external device 205. For example, the initial control may be given to the initiator of the call but may be changed one or more times throughout the call.

Figure 5:
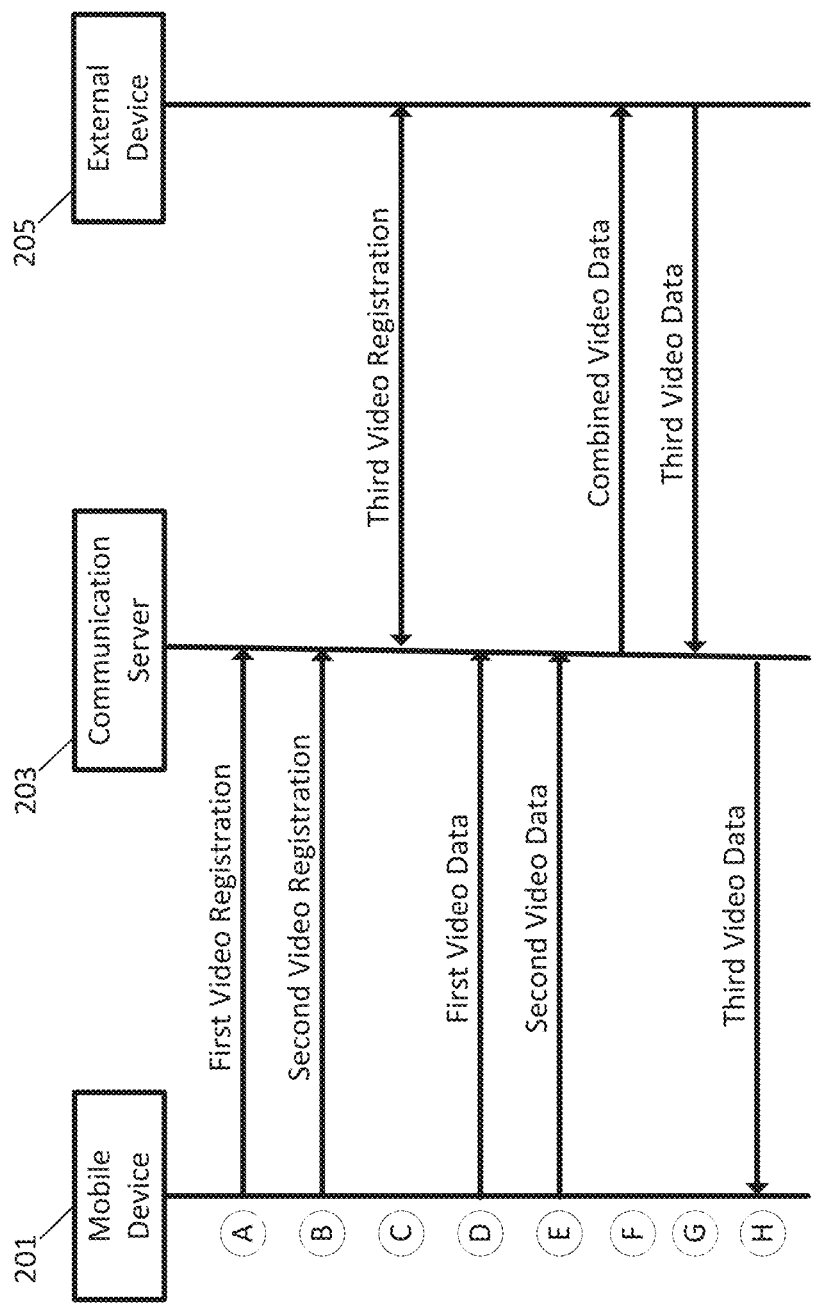
FIG. 5 illustrates an example timing diagram for multiple camera access in a video conference.

FIG. 5 illustrates an example timing diagram for multiple camera access in a video conference between the mobile device 201 and the external device 205 as established by the communication server 203. Additional, different, or fewer messages may be exchanged by the mobile device 201, the communication server 203, and the external device 205.

At stage A, the mobile device 201 sends a first video registration message to the communication server 203. The first video registration message may correspond to the internal camera 202. The first video registration message may be a session initiation protocol (SIP) invite message. The SIP invite message may be modified to include a camera identification value for the internal camera 202. The communication server 203 may generate and return an acceptance message. The acceptance message may be a SIP OK message. In response to the acceptance message, or originally in the vide registration message, the mobile device 201 may generate and return acknowledgement (ACK) message. The ACK may contain the IP address, port, codecs and the resolution that the internal camera 202 supports.

At stage B, the mobile device 201 sends a second video registration message to the communication server 203. The second video registration message may correspond to the external camera 204. The second video registration message may be a SIP invite message. The SIP invite message may be modified to include a camera identification value for the external camera 204. In response to the SIP invite message, the communication server 203 may send an acceptance message (e.g., SIP OK message). In response to the acceptance message, or originally in the vide registration message, the mobile device 201 may generate and return an acknowledgment (ACK) message. The ACK may contain the IP address, port, codecs and the resolution that the external camera 204 supports, any combination of which may be different than that of the internal camera 202.

At stage C, the communication server 203 sends a third video registration message to the external device 205. The third video registration message is generated in response to the first and/or second video registration messages. Third video registration message may be a SIP invite message. The external device 205 may response to the third video registration message with the IP address, port, codecs and the resolution that the external device 205 supports. Alternatively, a registration message may originate with the external device 205 and be sent to the communication server 203.

Stages D through H occur in any order and may occur repeatedly and simultaneously. At stages D and E, the communication server 203 receives video data from the mobile device 201. At stage G, the communication server 203 receives video data from the external device 205. In one example, the communication server 203 combines the first and second video data and sends the combined video stream to the external device 205 at stage F, and the communication server 203 sends the third video data to the mobile device 201 at stage G. In another example, the communication server 203 combine the three video data stream into a single video stream and sends the single video stream to both the mobile device 201 and the external device 205.

Figure 6:
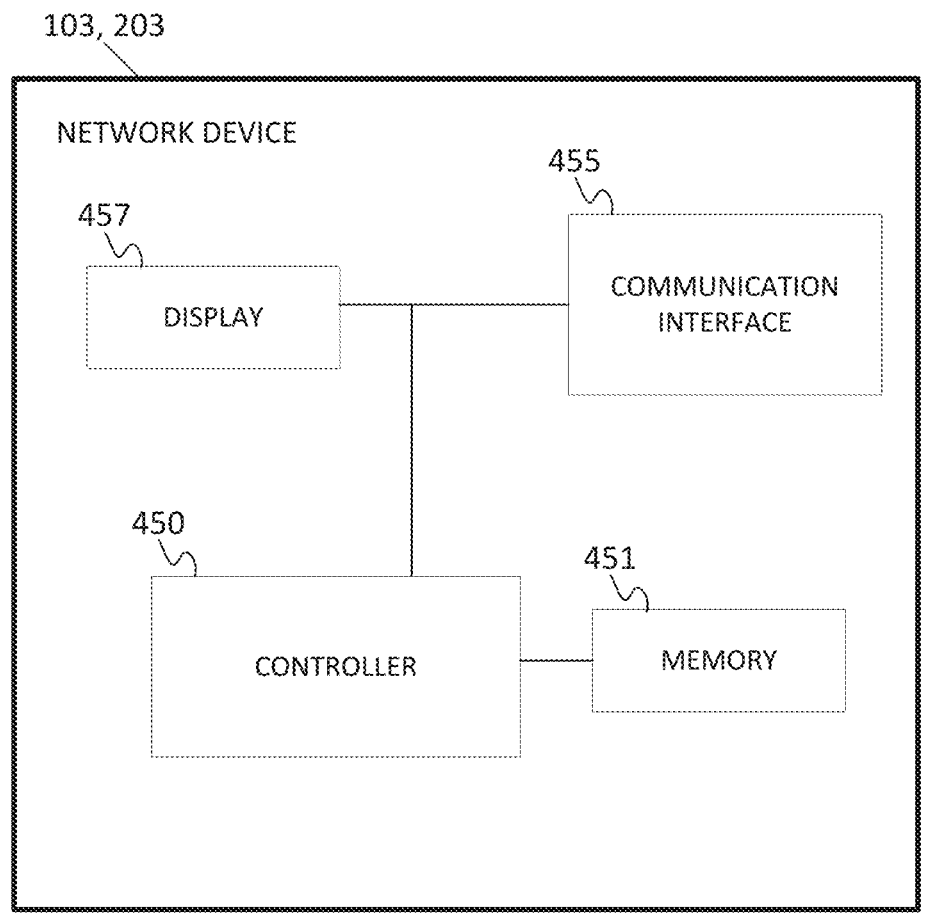
FIG. 6 illustrates an example network device for the system of FIG. 1.

FIG. 6 illustrates an example network device for the system of FIG. 1. The network device includes at least a memory 451, a controller 450, a communication interface 455, and, optionally, a display 457. Additional, different, or fewer components may be provided. Different network devices may have the same or different arrangement of components. The network device may correspond to the server 103 shown in FIG. 1 or the communication server 203 shown in FIGS. 2 and 5.

The network device may be behind a firewall or include a firewall device. The firewall device may include a rule set that defines that defines filters for incoming traffic and outgoing traffic. The filters may include one or more packet filters that restrict video data or video streams from passing the firewall device and be further processed by the network device.

The memory 451 is configured to store a registry of devices that modify the firewall and associate cameras with mobile devices. The guest registry may include a white list of devices that are exempt from the firewall. The guest registry may include a lookup table that logically associates multiple cameras as video phones with each of multiple mobile devices.

The communication interface 455 is configured to receive first video data from a first camera associated with the mobile device 201 and second video data from a second camera associated with the mobile device 201. The controller 450 is configured to initiate a multiple party conference call including the first camera, the second camera, and a call center device. The conference call may be a three-way video phone call with each of the first camera, the second camera, and the call center device as video phones. The conference call may comprise a combined video stream including the first video data, the second video data, and third video data from the call center device. The combined video stream may be displayed on both the mobile device 201 and the call center device.

Alternatively, the conference call may comprise an internal combined video stream and an external combined video stream. The internal combined video stream for display at the call center device comprises the first video data and the second data. The external combined video stream for display at the mobile device 201 comprises the third video data.

The multiple party conference call may be initiated in response to an email from a user of the mobile device 201. For example, the mobile device 201 sends an email, which passes through the firewall, to the network device. The network device extracts the identity of the mobile device 201 from the email, and queries the guest registry using the identity of the mobile device 201. The network device selects one or more cameras or video phones from the guest registry associated with the identity of the mobile device 201 and establishes the conference call with the cameras of video phones. Example protocols for the conference call include H.323, MGCP, or other protocols. Example signaling protocols for the conference call include SIP, skinny, or other protocols.

One or more of the plurality of the camera views may be encoded in multiple formats. The multiple formats may vary in size, resolution, number of colors, frame rate, definition type, or another property of the video. Example sizes may be measured in the diagonal size of the display (e.g., 3 inches, 10 centimeters). Example resolutions may be expressed in the number of pixels (e.g., 1, 5, 10, 50 megapixels) or by the number of lines in each direction (480×720, 1024×968, or another value). Example numbers of color include 1 color, 16 colors, 256 colors, 50,000 colors or 16.7 million colors. Example definition types include standard definition, high definition, or another type of definition. Example protocols for multiple formats include scalable video coding (SVC) or high efficiency video coding (HEVC).

Figure 7:
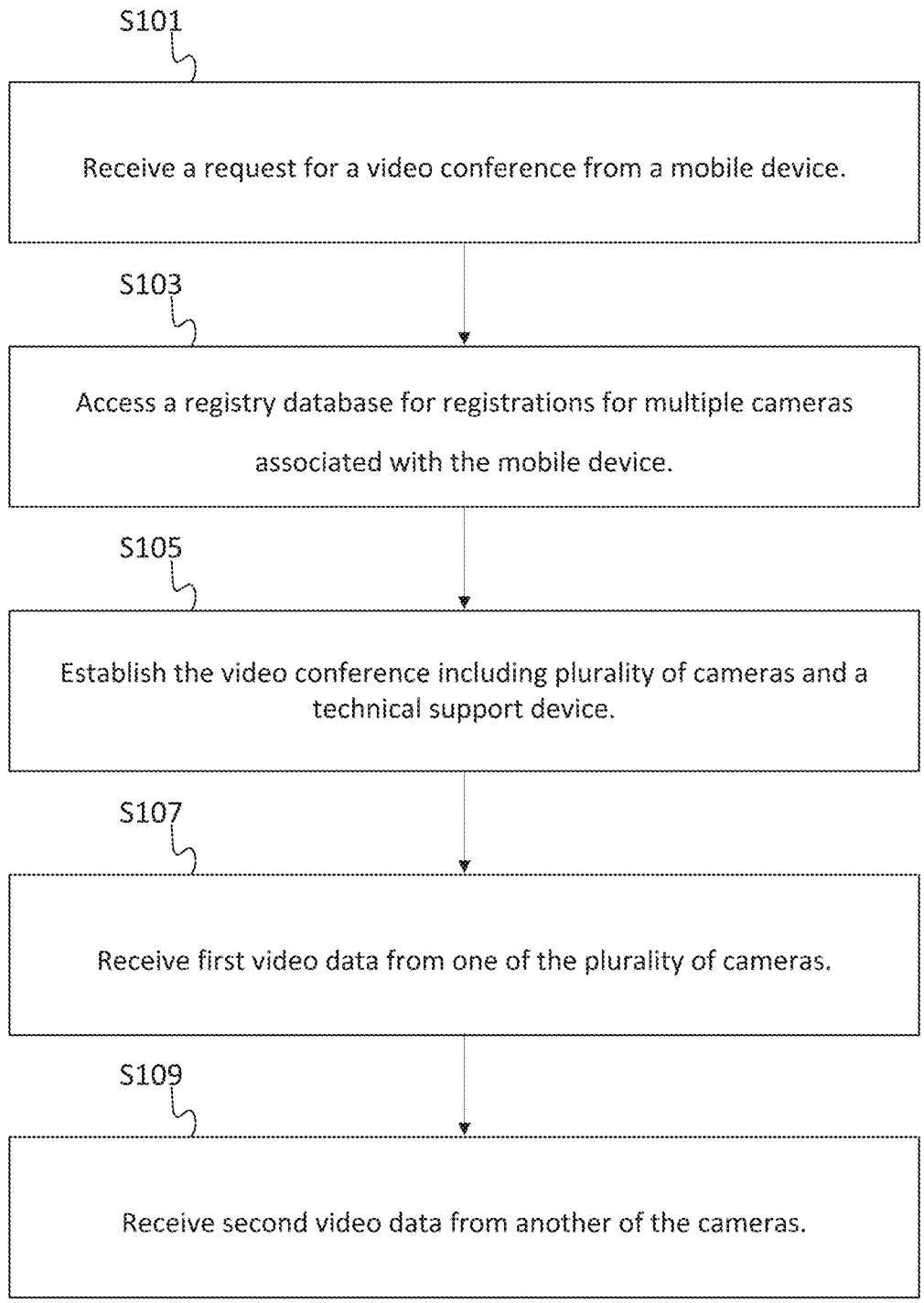
FIG. 7 illustrates an example flow chart for multiple camera access in a video conference.

FIG. 7 illustrates an example flow chart for multiple camera access in a video conference. The acts of the flow chart may be performed by the network device, communication server 203, server 203, mobile device 201, or by a combination of devices. Additional, different, or fewer acts may be included. The acts are performed in the order shown or other orders. The acts may also be repeated.

At act S101, a request for a video conference is received from a mobile device. The request may be received in email or through a mobile application. The request passes through a firewall to the network device. However, video streams cannot automatically pass through the firewall. The request may specify a type of technical support that is requested. For example, the request may specify a model number of a device, a warranty number, or a trouble code provided by a computer or another electronic device.

At act S103, the network device accesses a registry database for registrations for multiple cameras associated with the mobile device. The cameras may be external to the mobile device. The cameras may communication through Bluetooth, infrared, or radio frequency signals to the mobile device. The cameras may be directly connected to a wireless network. One or more of the cameras may be internal to the mobile device.

At act S105, a video conference call including the multiple cameras and a technical support device is established. The network device may access a technical support database in order to identify the technical support device. For example, the model number, warranty number, or trouble code in the request may be associated in the technical support database with a telephone number, Internet address, operator number, or other identifier for the technical support device. The network device connects the mobile device and the technical support device based on the request received in S101.

In any of these cases, one of the video cameras sends video data to the network device at act S107, and another of the video cameras sends video data to the network device at act S109, which is relayed to the technical support device. Communication in the other direction, which may be video, audio, or both, may be received from the technical support device and forwarded to the mobile device.

The controller 450 may include a general processor, digital signal processor, an application specific integrated circuit (ASIC), field programmable gate array (FPGA), analog circuit, digital circuit, combinations thereof, or other now known or later developed processor. The controller 450 may be a single device or combinations of devices, such as associated with a network, distributed processing, or cloud computing.

The memory 451 may be a volatile memory or a non-volatile memory. The memory 451 may include one or more of a read only memory (ROM), random access memory (RAM), a flash memory, an electronic erasable program read only memory (EEPROM), or other type of memory. The memory 301 may be removable from the network device, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface. The display 457 may also include an input device (e.g., touchscreen). The display 457 may include a CRT (cathode ray tube), a LCD (liquid crystal display), or another type of monitor.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium (e.g., memory 451), the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    registering a first camera in a guest registry, wherein the first camera is integrated with a mobile device and has a first set of credentials;
    receiving first video data from the first camera, wherein the first video data of the multiple party conference includes images of a caller or front facing video from the mobile device;
    registering a second camera in the guest registry as logically associated with the mobile device, wherein the second camera has a second set of credentials;
    receiving second video data from the second camera, wherein the second video data of the multiple party conference includes an object of interest for a support call; and
    establishing, via a network, a multiple party conference call using the guest registry, wherein the multiple party conference call includes the first camera, the second camera, and an external device.

2. The method of claim 1, further comprising:
    receiving a call initiation request from the mobile device, wherein the multiple party conference is established in response to the call initiation request.

3. The method of claim 1, further comprising:
    receiving an email from a customer; and
    accessing the guest registry in response to the email.

4. The method of claim 1, wherein the second video data of the multiple party conference includes at least one sensor reading related to the object of interest.

5. The method of claim 1, wherein the object of interest is an appliance, a vehicle, a computer, an oil rig, or a windmill.

6. The method of claim 1, wherein the object of interest is repaired by a user of the mobile device under the direction of an expert associated with the external device.

7. The method of claim 1, further comprising:
    generating a combined video feed for the external device, wherein the combined video feed includes a split screen display of the first video data and the second video data.

8. The method of claim 1, wherein the second camera communicates with the network via the mobile device.

9. The method of claim 1, wherein the second camera communicates directly with the network.

10. The method of claim 1, further comprising:
    receiving sensor data from an environmental sensor, wherein the sensor data is included in the multiple party conference call.

11. The method of claim 1, wherein the external device is a part of a network protected by a firewall, and the first and second cameras are on a separate network from the external device.

12. An apparatus comprising:
    a memory configured to store a registry of devices including a first camera integrated with a mobile device and a second camera logically associated with the mobile device, wherein the registry of devices includes credentials for the devices stored in the registry;
    a communication interface configured to receive first video data from the first camera and second video data from the second camera; and
    a processor configured to initiate a multiple party conference call using the registry of devices, and wherein the multiple party conference call includes the first camera, the second camera, and an external device configured to annotate the vide from the second camera,
    wherein the multiple party conference is a support call, and the second video data of the multiple party conference includes an object of interest for the support call.

13. The apparatus of claim 12, wherein the processor is configured to generate a combined stream including the first video data, the second video data, and third video data from the external device.

14. The apparatus of claim 13, wherein the processor is configured to annotate the second video data based on a user input.

15. The apparatus of claim 12, wherein the multiple party conference call is initiated in response to an email from a user of the mobile device.

16. The apparatus of claim 12, wherein the processor is configured to select the external device based on a request from a user of the mobile device.

17. The apparatus of claim 12, wherein the first video data of the multiple party conference includes images of a caller or front facing video from the mobile device.

18. A non-transitory computer readable medium including instructions that when executed are configured to cause a processor to:
  receive a request for a video conference from a mobile device;
  access a registry database for registrations for a plurality of cameras associated with the mobile device;
  establish a multiple party support conference using the registry database, wherein the multiple party support conference includes a plurality of cameras and a technical support device;
  receive first video data from one of the plurality of cameras;
  receive second video data from another of the plurality of cameras,
  receive an annotation from the technical support device; and
  modify the first video data or the second video data in the multiple party support conference based on the annotation.

19. The non-transitory computer readable medium of claim 18, wherein the first video data includes images of a user of the mobile device and the second video data includes images for technical support.

20. The non-transitory computer readable medium of claim 18, wherein the first camera is integrated with the mobile device and the second camera is a peripheral of the mobile device.

* * * * *